United States Patent

Demassa

(10) Patent No.: US 8,716,359 B2
(45) Date of Patent: May 6, 2014

(54) POLYURETHANE FOAM SCORCH INHIBITOR

(75) Inventor: John M. Demassa, Trumbull, CT (US)

(73) Assignee: Vanderbilt Chemicals, LLC, Norwalk, CT (US)

( * ) Notice: Subject to any disclaimer, the term of this patent is extended or adjusted under 35 U.S.C. 154(b) by 531 days.

(21) Appl. No.: 12/726,950

(22) Filed: Mar. 18, 2010

(65) Prior Publication Data

US 2011/0230579 A1     Sep. 22, 2011

(51) Int. Cl.
    *C08G 18/28*    (2006.01)

(52) U.S. Cl.
    USPC ............. 521/99; 521/117; 521/128; 521/129; 521/170; 521/174

(58) Field of Classification Search
    USPC ................ 521/99, 117, 128, 129, 170, 174
    See application file for complete search history.

(56) References Cited

U.S. PATENT DOCUMENTS

| 4,010,211 A | 3/1977 | Preston et al. |
| T968,002 I4 | 3/1978 | Baxter et al. |
| 4,275,173 A | 6/1981 | Hinze |
| 4,444,676 A | 4/1984 | Statton et al. |
| 4,933,374 A | 6/1990 | Suhoza et al. |
| 5,143,943 A * | 9/1992 | Suhoza et al. ............... 521/115 |
| 5,167,844 A | 12/1992 | Schumacher et al. |
| 5,219,892 A | 6/1993 | Suhoza |
| 5,571,453 A | 11/1996 | Barry et al. |
| 6,676,849 B2 | 1/2004 | DeMassa |

FOREIGN PATENT DOCUMENTS

JP      61-130320    *    6/1986

OTHER PUBLICATIONS

International Search Report Dated Nov. 3, 2010.

* cited by examiner

*Primary Examiner* — John Cooney
(74) *Attorney, Agent, or Firm* — Norris McLaughlin & Marcus P.A.

(57) ABSTRACT

A scorch inhibitor composition for polyurethane foams is composed of
(a) one or more derivatized phenolic compounds in an amount of about 60-80% by weight;
(b) one or more aromatic amines in the form of a liquid in an amount of about 15-35% by weight;
(c) an alkyl-substituted hydroquinone in an amount of about 4-8% by weight, and
(d) phenothiazine at 0 to about 1.0% by weight.

7 Claims, No Drawings

POLYURETHANE FOAM SCORCH INHIBITOR

BACKGROUND OF THE INVENTION

1. Field of the Invention

The invention to relates to liquid scorch inhibitor compositions for polyurethane foam compositions.

2. Discussion of the Prior Art

Those familiar with the manufacture of flexible polyurethane slabstock-type foams have observed the phenomenon known as scorch, which is a manifestation of polymer degradation. Visually, scorch appears as a darkening in the interior of a polyurethane foam bun that can be quantitatively characterized in hue, value and chroma. Scorch is a well understood thermo-oxidative degradation process which is generally the result of free-radical reactions involving the polyurethane matrix, polyetherpolyol, isocyanate (MDI or TDI) and additives within the foam. For example, at elevated temperatures (200° C., 392° F.), 4,4'-diphenylmethane diisocyanate-based thermoplastic polyurethane elastomers suffer main chain rupture. Heat is also known to cause other homolytic degradation processes, such as hydrogen atom abstraction from carbon alpha to the ether linkage. Generated free radicals combining with oxygen lead to hydro-peroxide species, which further cleave and propagate degradation. Expectedly, polyols based upon polypropylene oxide glycols are less stable than those based upon polyethylene glycol due to stability differences of alpha carbon free radical. Thus, scorch degradation follows well understood reaction pathways. Historically CFCs have been used in foam formulations to remove excessive heat build up and thereby diminish the scorch effect. However, because of reductions in chlorofluorocarbons (CFCs) and, more currently, transitional hydrochlorofluorocarbons (HCFC), coupled with increases in water to compensate (up to 6 pph) in foam formulations, scorch continues to be of great concern to the industry.

To counter scorch or destructive free radical reactions, antioxidants are added. A review of the patent literature shows diversity of antioxidant formulation strategies.

U.S. Defensive Publication No. T968,002 to Baxter teaches blends of aromatic amines, hydroquinone (structure 1 below) and phosphite to produce a functioning scorch inhibitor. U.S. Pat. No. 4,010,211 to Preston discloses the use of an effective amount of a select diphenylamine derivative, alone or in further combination with hydroquinone, which serves to inhibit scorching in the polyurethane foam. U.S. Pat. No. 6,676,849 to DeMassa teaches a blend of tert-amyl-hydroquinone with commercial phenolics. Thus, hydroquinone and derivatives have been used in various scorch inhibitor blends.

Current commercially available conventional compositions follow the teachings of U.S. Pat. No. 4,275,173 to Hinze and U.S. Pat. No. 4,444,676 to Statton, but other blends have also appeared varying upon this theme. U.S. Pat. No. 4,933,374 to Suhoza reports a similar effective scorch inhibitor blend consisting of (a) tetrakis[methylene(3,5-di-tert-butyl-4-hydroxyhydrocinnamate)]methane and (b) a reaction product of diphenylamine and diisobutylene, wherein the molar ratio of the amine to the diisobutylene is 1:1.1 to 1:2.5. The stabilizer composition may contain a third synergistic component, phenothiazine, or certain alkyl derivatives of phenothiazine.

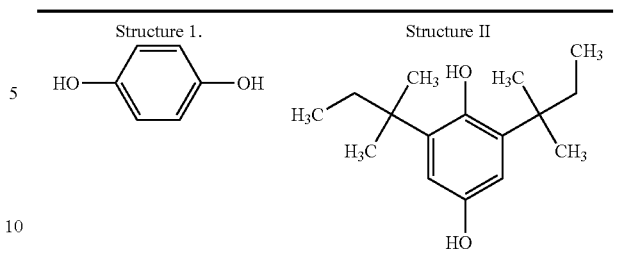

We have now discovered that a liquid blend comprised as follows is surprisingly superior as a scorch inhibitor composition for polyurethane foams to the above discussed blends:
(a) one or more derivatized phenolic compounds
(b) one or more aromatic amines in the form of a liquid
(c) a substituted hydroquinone, and
(d) optionally, phenothiazine.

DETAILED DESCRIPTION OF THE INVENTION

A standard polyurethane foam formulation (Table A) was used to test representative scorch inhibitor blends. Other known foam formulations can be used as well:

TABLE A

|  | parts |
| --- | --- |
| Polyol | 100.00 |
| Distilled Water | 5.50 |
| L5770 Silicone (OSi) | 1.20 |
| A127 Amine Catalyst (OSi) | 0.47 |
| Fyrol FR2 (Akzo/Nobel) | 7.00 |
| Dabco T9 (Air Products) | 0.25 |
| Mondur TD80 Grade A TDI (Bayer AG) | 70.80 |
| Additive | 0.50 |

An embodiment of the scorch inhibitor of the invention is a multi-component liquid system comprising (in weight %):
(1) a phenolic compound or blend, from about 60-80% by weight. Examples of acceptable derivatized phenolics include: tetrakis[methylene(3,5-di-tert-butyl-4-hydroxyhydrocinnamate)]methane, iso-octyl-3-(3,5-di-tert-butyl-4-hydroxyphenyl)propionate, isotridecyl-3-(3,5-di-tert-butyl-4-hydroxyphenyl)propionate and 2,6 di-tert-butyl-4-nonyl phenol or 1,2-bis(3,5-di-tert-butyl-4-hydroxyhydrocinnamoyl)hydrazine or 2,2'-thiodiethylene bis[3-(3,5-di-t-butyl-4-hydroxyphenyl)propionate; i-octyl-3-(3,5-di-tert-butyl-4-hydroxyphenyl) propionate; and tetrakis[methylene 3-(3,5-di-tert-butyl-4-hydroxyphenyl)propionate]methane. Further examples of derivatized phenolics include a (2,6-di-tert-butyl)phenol substituted at the 4 position with an aliphatic, aromatic or aliphatic-aromatic moiety, also optionally possessing combinations of hetero atoms such as O, N, S, and P.

In a preferred embodiment of the present invention, the phenolic component is present as one or more in combination of (i) tetrakis[methylene(3,5-di-tert-butyl-4-hydroxyhydrocinnamate)]methane ("Phenolic 1"); (ii) iso-octyl-3-(3,5-di-tert-butyl-4-hydroxyphenyl)propionate ("Phenolic 2"); and (iii) isotridecyl-3-(3,5-di-tert-butyl-4-hydroxyphenyl)propionate ("Phenolic 3").

(2) An aromatic amine, namely, a dialkyl diphenyl amine, or blend of such aromatic amines, to form a liquid (such as a reaction product of diisobutylene and diphenylamine, CAS Reg. No. 68411-46-1) ("DPA"), from about 15-35%. Other aromatic amines include 4,4'-bis(.alpha.,.alpha.-dimethylbenzyl)diphenyl amine ("DPA2") and the like.

(3) An alkyl substituted hydroquinone such as 2,5-di-tert-amyl-hydroquinone ("DTAHQ") or di-tert-butyl-hydroquinone ("DTBHQ") from about 4-8%, wherein the most effective alkyl groups are tert butyl (C4) or isoamyl (C5)

(4) Optionally, phenothiazine (PTZ) from 0 to 1%, preferably about 0.7%.

The scorch inhibitor may be present in the foam formulation based on a range of about 0.10 to 0.75 parts per 100 parts polyol, preferably about 0.30 to 0.60, and more preferably about 0.35 to 0.50.

Quantitative Treatment of Data

A Technidyne Corp. Brightimeter Micro S4-M was used to quantify color development in foam samples. L.a.b. values, from the Hunter L.a.b. scale, assigns to each variable (lightness (L), a, b) a corresponding dimension (x, y, z) and creates a color space. L.a.b. readings taken from a specimen, represent color deviation from the brightest unscorched area of the subject foam. In practice, L.a.b. readings are first acquired from a control then compared [($L_1$, $a_1$, $b_1$) or (L, a, b)$_1$] to a subject specimen [($L_2$, $a_2$, $b_2$) or (L, a, b)$_2$]. A delta E value is then reported.

$$\Delta E = \sqrt{(L_1-L_2)^2+(a_1-a_2)^2+(b_1-b_2)^2}$$

(L.a.b.)$_1$ represents values taken from an arbitrary standard or control, while (L.a.b.)$_2$ represents values specific to a selected specimen. The composite value $\Delta E$, quantitatively expresses color drift away from the control. (One might also recognize that $\Delta E$ is the distance formula for 3-space. Thus the distance of any two points in 3-space is measured using this formula.) Importantly, the $\Delta E$ value is merely an absolute distance from the control which in our case represents discoloration from the whitest portions of the subject foams un-scorched area. Because foam production is highly dependent upon environmental factors variation in $\Delta E$ values from day to day. In an effort to normalize reported values, we routinely ran a control (Ex. K) the same day as the test foam. The test foam $\Delta E$ value was then divided by the control $\Delta E$ and reported. This ratio helped to located color differences relative to the control at a glance for the particular day of testing. Where appropriate we reported comparative $\Delta E$ values without this normalization procedure.

Additional Assessments

Formulations presented in this patent were subjected to a microwave scorch test. The resultant foam bun was allowed to cool after reaction and split open for visual inspection. We compared each formulation to a control (containing a conventional scorch inhibitor) run the same day. In addition to scorch testing we also found that the claimed formulations performed well compared with the controls when foams were exposed to NOx treatment in a fume chamber and ambient fluorescent light. We also discovered that the new formulation displayed a lower volatility than conventional blends which is an important performance parameter for PU foam used in car interiors. It is our position that the uniqueness of the inventive liquid formulation described below arises from its better scorch protection than conventional blends and lower foam discoloration contribution in various stress tests.

Exemplary blends according to embodiments of the present invention (Examples 1-10) (Table 1) were compared with competitive blends (Examples C13-C17) (Table 2). At 5000 ppm (or 0.5 pph), the inventive blends were found to suppress scorch better than Comparative Example C13 (prepared according to the teaching of the prior-mentioned Suhoza patent); Comparative Examples C15 and C16 (two formulation variants prepared according to the teaching of the prior-mentioned Preston patent); and Comparative Example C14 (prepared according to the prior-mentioned Hinze and Statton patents).

Importantly, comparative Examples C15 and C16 are both solid blends, which offer potential comparative references but lack the desirable liquid attribute offered with the inventive composition. Example C17, showed a marginally acceptable scorch inhibition even without the presence of dialkyl diphenyl amine. However, the range of phenolic (94.7%) required to achieve that result is well outside the scope of the present invention. In general, the optimum compositions consists of an alkyl-HQ derivative, dialkyl-diphenyl amine, phenolic blend, and PTZ, performing in the range of 0.5-0.7.

The effect of structural changes to hydroquinone was evaluated. In addition to the preferred 2,5-di-tert-amyl-hydroquinone (DTAHQ), also compared were: hydroquinone (HQ) (Example 12); di-tert-butyl-hydroquinone (DTBHQ) (Example 10); and dichlorodihydroxyanthroquinone (DCDAQ) (Example 12). It is clear that an alkyl substitution on the hydroquinone ring (DTAHQ, DCBHQ) (Examples 1-9; Example 10) improved scorch performance over no substitution (HQ) (Example 11) or controls. In addition, it was found that the chlorinated substitution (DCDAQ) (Example 12), though providing an acceptable delta E comparative value, resulted in an unacceptable discoloring.

Accordingly, only by preparing a scorch inhibitor composition based on the inventive three component system, within the specific ranges, can provide surprisingly effective scorch inhibition be achieved, without the drawbacks mentioned above.

TABLE 1

| Example # | K | 1 | 2 | 3 | 4 | 5 | 6 | 7 | 8 | 9 | 10 | 11 | 12 |
|---|---|---|---|---|---|---|---|---|---|---|---|---|---|
| Raw Materials | | | | | | | | | | | | | |
| DTAHQ | | 4.59 | 4.59 | 8.00 | 4.59 | 4.59 | 4.59 | 4.59 | 4.59 | 4.59 | | | |
| HQ | | | | | | | | | | | | 2.01 | |
| DTBHQ | | | | | | | | | | | 4.09 | | |
| DCDAQ | | | | | | | | | | | | | 5.65 |
| DOHQ | | | | | | | | | | | | | |
| DPA | 66.82 | 33.23 | 33.23 | 33.23 | 33.23 | 33.23 | 16.61 | 0 | 33.23 | 0 | 33.23 | 33.23 | 33.23 |
| DPA2 | 0 | 0 | 0 | 0 | 0 | 0 | 0 | 33.23 | 0 | 33.23 | 0 | | |
| Phenolic 1 | 22.5 | 9.06 | 18.12 | 14.71 | 18.12 | 18.12 | 18.12 | 18.12 | 0 | 0 | 18.12 | 18.12 | 18.12 |
| Phenolic 2 | | 30.72 | 21.66 | 39.78 | 21.66 | 43.32 | 38.28 | 39.78 | 39.78 | 39.78 | 21.66 | 21.66 | 21.66 |
| Phenolic 3 | | 21.68 | 21.68 | 21.68 | 21.68 | 0 | 21.68 | 21.68 | 21.68 | 21.68 | 21.68 | 21.68 | 21.68 |

TABLE 1-continued

| Example # | K | 1 | 2 | 3 | 4 | 5 | 6 | 7 | 8 | 9 | 10 | 11 | 12 |
|---|---|---|---|---|---|---|---|---|---|---|---|---|---|
| PTZ | 1.0* | 0.72 | 0 | 0.72 | 0.72 | 0.72 | 0.72 | 0.72 | 0.72 | 0.72 | 0.72 | 0.72 | 0.72 |
| dE Ex/dE K | 1.0 | 0.68 | 0.69 | 0.71 | 0.59 | 0.71 | 0.52 | 0.75 | 0.86 | 0.59 | 0.70 | 1.20 | 0.87 |

* Control example K also contains 9% diluent oil Uninap 100SD and 0.68% Triisodecyl Phosphite

TABLE 2

| Raw Materials | Example # | | | | |
|---|---|---|---|---|---|
| | C13 | C14 | C15 | C16 | C17 |
| DTAHQ | 22.5 | | | | 4.59 |
| HQ | | | 80 | 20 | |
| DTBHQ | | | | | |
| DCDAQ | | | | | |
| DOHQ | | | | | |
| DPA | 67.5 | 33.1 | | | |
| DPA2 | | | 20 | 80 | |
| Phenolic 1 | | | | | 18.12 |
| Phenolic 2 | | 66.2 | | | 54.9 |
| Phenolic 3 | | | | | 21.68 |
| PTZ | 1 | 0.7 | | | 0.72 |
| dE Ex/dE K | 1.16 | 0.81 | 0.85 | 1.18 | 0.72 |

Raw Materials Key
DTAHQ 2,5-di-tert-amyl-hydroquinone
HQ hydroquinone
DTBHQ di-tert-butyl-hydroquinone
DCDAQ dichlorodihydroxyanthroquinone
DPA diisobutylene and diphenylamine, CAS Reg. No. 68411-46-1 or Mixture of alkylated diphenylamines and organic phosphorus compound (NJTSR No. 01023400-5083P) and diphenylamine
DPA2 styrene and 2,4,4 trimethyl pentene and diphenyl amine, resulting in a mixture of 4,4'-bis(.alpha.,.alpha.-dimethylbenzyl)diphenyl amine and other alkylated and styrenated derivatives (SL): CAS 68921-45-9
Phenolic 1 Tetrakis[methylene-3-(3,5-di-tert-butyl-4-hydroxyphenyl)propionate] methane
Phenolic 2 Iso-octyl-3-(3,5-di-tert-butyl-4-hydroxyphenyl) propionate
Phenolic 3 Isotridecyl-3-(3,5-di-tert-butyl-4-hydroxyphenyl) propionate
PTZ Phenothiazine

What is claimed is:

1. A polyurethane foam composition comprising polyol and a scorch inhibitor composition at about 0.10 to 0.75 parts per 100 parts polyol, the scorch inhibitor composition comprising:
    (a) one or more derivatized phenolic compounds in an amount of about 60-80% by weight;
    (b) one or more aromatic amines in the form of a liquid in an amount of about 15-35% by weight;
    (c) an alkyl-substituted hydroquinone in an amount of about 4-8% by weight, selected from 2,5-di-tert-amyl-hydroquinone and di-tert-butyl-hydroquinone; and
    (d) phenothiazine at 0 to about 1.0% by weight.

2. The composition of claim 1, wherein the derivatized phenolic compound is selected from the group consisting of tetrakis[methylene(3,5-di-tert-butyl-4-hydroxyhydrocinnamate)]methane; iso-octyl-3-(3,5-di-tert-butyl-4-hydroxyphenyl)propionate; isotridecyl-3-(3,5-di-tert-butyl-4-hydroxyphenyl)propionate; octadecyl-3-(3,5-di-tert-butyl-4-hydroxyphenyl)propionate; 2,6 di-tert-butyl-4-nonyl phenol; 1,2-bis(3,5-di-tert-butyl-4-hydroxyhydrocinnamoyl)hydrazine; 2,2'-thiodiethylene bis[3-(3,5-di-t-butyl-4-hydroxyphenyl)propionate; a (2,6-di-tert-butyl) phenol substituted at the 4 position with an aliphatic, aromatic or aliphatic-aromatic moiety, optionally possessing combinations of hetero atoms O, N, S, and P; and mixtures thereof.

3. The composition of claim 2, wherein the derivatized phenolic compound comprises one or more in combination of (i) tetrakis[methylene(3,5-di-tert-butyl-4-hydroxyhydrocinnamate)]methane; (ii) iso-octyl-3-(3,5-di-tert-butyl-4-hydroxyphenyl)propionate; and (iii) isotridecyl-3-(3,5-di-tert-butyl-4-hydroxyphenyl)propionate.

4. The composition of claim 1, wherein the aromatic amine is one or both of (a) a reaction product of diisobutylene and diphenylamine and (b) 4,4'-bis(.alpha.,.alpha.-dimethylbenzyl)diphenyl amine).

5. The composition of claim 1, wherein the alkyl-substituted hydroquinone is 2,5-di-tert-amyl-hydroquinone.

6. The composition of claim 1, wherein
    (a) is one or more of tetrakis[methylene(3,5-di-tert-butyl-4-hydroxyhydrocinnamate)]methane; iso-octyl-3-(3,5-di-tert-butyl-4-hydroxyphenyl)propionate; and isotridecyl-3-(3,5-di-tert-butyl-4-hydroxyphenyl)propionate;
    (b) is a reaction product of diisobutylene and diphenylamine;
    (c) is 2,5-di-tert-amyl-hydroquinone; and
    (d) phenothiazine is present.

7. The composition of claim 1, wherein the scorch inhibitor composition is present at about 0.3 to 0.6 parts per 100 parts polyol.

* * * * *